(12) United States Patent
Saeedi et al.

(10) Patent No.: US 12,132,923 B2
(45) Date of Patent: Oct. 29, 2024

(54) MOTION ESTIMATION USING PIXEL ACTIVITY METRICS

(71) Applicant: ATI TECHNOLOGIES ULC, Markham (CA)

(72) Inventors: Mehdi Saeedi, Markham (CA); Boris Ivanovic, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 90 days.

(21) Appl. No.: 16/113,212

(22) Filed: Aug. 27, 2018

(65) Prior Publication Data
US 2020/0068214 A1    Feb. 27, 2020

(51) Int. Cl.
*H04N 11/02*   (2006.01)
*H04N 19/513*  (2014.01)

(52) U.S. Cl.
CPC .................. *H04N 19/513* (2014.11)

(58) Field of Classification Search
CPC ..................................... H04N 19/513
USPC ....................... 375/240.01–240.29
See application file for complete search history.

(56) References Cited

U.S. PATENT DOCUMENTS

| | | | | |
|---|---|---|---|---|
| 6,128,341 A * | 10/2000 | Kwak | ................ | H04N 19/59 375/240 |
| 6,943,919 B1 * | 9/2005 | Barnick | ................ | B41J 2/465 347/237 |
| 7,145,950 B2 * | 12/2006 | Hsu | ................ | H04N 19/557 375/E7.118 |
| 7,277,580 B2 * | 10/2007 | Xu | ................ | G06T 7/136 382/173 |
| 7,301,674 B2 * | 11/2007 | Feng | ................ | B41J 2/205 358/3.06 |
| 8,369,609 B2 * | 2/2013 | Xu | ................ | G06V 10/40 348/208.13 |
| 8,432,970 B1 * | 4/2013 | Cahalan | ................ | H04N 19/119 375/240.16 |
| 2004/0114688 A1 * | 6/2004 | Kang | ................ | H04N 19/53 375/E7.107 |
| 2006/0103732 A1 * | 5/2006 | Bateman | ................ | G11B 27/28 375/E7.263 |
| 2006/0140442 A1 * | 6/2006 | ElRayess | ................ | H04N 1/32309 382/100 |
| 2007/0014368 A1 * | 1/2007 | MacInnis | ................ | H04N 19/521 348/E5.077 |
| 2007/0071105 A1 * | 3/2007 | Tian | ................ | H04N 19/109 375/E7.149 |

(Continued)

OTHER PUBLICATIONS

W. Li et al., "Successive Elimination Algorithm for Motion Estimation", IEEE Transactions on Image Processing, vol. 4, Issue 1, Jan. 1995, 3 pages.

*Primary Examiner* — Leron Beck (57) ABSTRACT

A processing system estimates motion between blocks of images based on differences in pixel activities between blocks. Blocks having similar pixel activities are more likely to be matches for motion estimation than are blocks having dissimilar pixel activities. Accordingly, the processing system compares pixel activity between current block of a current image and candidate blocks within a search area in the reference image, and estimates motion based on a subset of candidate blocks having a difference in pixel activity from that of the current block within a threshold.

20 Claims, 3 Drawing Sheets

(56) References Cited

U.S. PATENT DOCUMENTS

| | | | | |
|---|---|---|---|---|
| 2007/0146794 A1* | 6/2007 | Ahmed | ............... | G06K 15/02 |
| | | | | 358/3.06 |
| 2007/0247681 A1* | 10/2007 | Klassen | ............... | H04N 1/193 |
| | | | | 358/532 |
| 2009/0207315 A1* | 8/2009 | Ikeda | ............... | G06T 7/223 |
| | | | | 348/700 |
| 2010/0302453 A1* | 12/2010 | Paschalakis | ........... | H04N 5/147 |
| | | | | 348/E9.037 |
| 2011/0268180 A1* | 11/2011 | Srinivasamurthy | .. | H04N 19/196 |
| | | | | 375/240.03 |
| 2012/0008834 A1* | 1/2012 | Chandrasekaran | .... | H04N 5/144 |
| | | | | 382/107 |
| 2012/0281759 A1* | 11/2012 | Xu | ............... | H04N 19/30 |
| | | | | 375/E7.243 |
| 2013/0202047 A1* | 8/2013 | Song | ............... | H04N 19/523 |
| | | | | 375/240.16 |
| 2015/0245056 A1* | 8/2015 | Lim | ............... | H04N 19/176 |
| | | | | 375/240.16 |
| 2015/0248767 A1* | 9/2015 | Poree | ............... | G06T 7/11 |
| | | | | 382/164 |
| 2016/0165235 A1* | 6/2016 | La | ............... | H04N 19/176 |
| | | | | 375/240.16 |
| 2018/0225816 A1* | 8/2018 | Schweid | ............... | G06F 18/22 |

\* cited by examiner

FIG. 1

| BLOCK (N,0,0) 201 | BLOCK (N,0,1) 202 | BLOCK (N,0,2) 203 |
|---|---|---|
| BLOCK (N,1,0) 204 | BLOCK (N,1,1) PA = 0.1 205 | BLOCK (N,1,2) 206 |
| BLOCK (N,2,0) 207 | BLOCK (N,2,1) 208 | BLOCK (N,2,2) 209 |

CURRENT BLOCK

BLOCK PIXEL ACTIVITIES FOR CURRENT IMAGE 210

| BLOCK (M,0,0) PA = 0.6 210 | BLOCK (M,0,1) PA = 0.3 211 | BLOCK (M,0,2) PA = 0.2 212 |
|---|---|---|
| BLOCK (M,1,0) PA = 0.1 213 | BLOCK (M,1,1) PA = 0.3 214 | BLOCK (M,1,2) PA = 0.4 215 |
| BLOCK (M,2,0) PA = 0.3 216 | BLOCK (M,2,0) PA = 0.5 217 | BLOCK (M,2,2) PA = 0.7 218 |

BLOCK PIXEL ACTIVITIES FOR CANDIDATE BLOCKS WITHIN SEARCH AREA OF REFERENCE IMAGE 220

MOTION ESTIMATION USING PIXEL ACTIVITY METRICS

BACKGROUND

Image processing systems frequently use a block prediction technique to locate similar groups of pixels in a sequence of video image frames (or pictures) to estimate motion of the blocks between frames. By predicting motion of the blocks, compression algorithms are able to leverage temporal redundancy in the image sequence to improve compression ratios. Block prediction divides a "current picture" (that is, the picture being compared) into groups, or "blocks", of pixels. One method of estimating motion is based on finding the most suitable block in a "reference picture" (that is, another picture at a different temporal position in the image sequence) for each block in the current picture. Each block from the current picture is examined at one point, and at the time of study is known as the "current block". "Candidate blocks" include the reference picture's block at the location corresponding to the current block, and other reference picture blocks around it, within a search area. The most suitable candidate is deemed to be the one that has the lowest cost.

One method of determining cost is to compute the sum of absolute difference between pixel samples of a candidate block in the reference image and pixel samples of the current block in the current image. There are other possible cost functions. Each candidate block's location can be described as an offset, or vector, from the current block location, noted as the horizontal and vertical displacements from the current block. A vector from the current block to the candidate block with the smallest cost in the search area is identified as the estimated motion vector. However, identifying the vector having the smallest sum of absolute differences is computationally intensive.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate systems and techniques for estimating motion between blocks of images based at least in part on differences in pixel activities between blocks. Many video processing algorithms, such as those used for texture analysis, calculate a metric such as pixel activity within blocks. For example, pixel activity such as variations of pixel intensities within a block may be used to detect edges, repeating patterns, and other structures or objects in an image. Pixel activity can be measured using various metrics such as, for example, using a gray-level co-occurrence matrix, a two-dimensional spatial mean gradient, wavelet or other transforms, discrete cosine function, or average value within a block. Although pixel activity is generally calculated for texture analysis, independent of motion estimation, blocks having similar pixel activities are more likely to be matches for motion estimation than are blocks having dissimilar pixel activities. Accordingly, in some embodiments, a motion estimation engine of a processing system compares pixel activity between a current block of a current image and candidate blocks of a reference image, and then estimates the motion vector from a subset of candidate blocks having a difference in pixel activity from that of the current block within a threshold. Pixel activity can be a quantity that is already available in the system or it can be calculated specifically for this purpose. By excluding from motion estimation those candidate blocks having pixel activity differences with the current block larger than a threshold, the processing system reduces the computational complexity of motion estimation, allowing the motion estimation engine to perform other calculations or save power by lowering clocks or sleeping.

In some embodiments, the motion estimation engine identifies the candidate block within a search area of the reference image having the lowest pixel activity difference with the current block of the current image as a match for purposes of defining motion vectors between pixels of the current image and pixels of the reference image. In some embodiments, the motion estimation engine employs a hybrid approach, in which the motion estimation engine identifies a subset of candidate blocks within the search area of the reference image based on the pixel activity differences between the subset of candidate blocks and the current block being lower than a threshold value and then applies a block-based motion estimation (or any other motion estimation method) comparing pixel-by-pixel within the subset to define motion vectors between pixels of the current image and pixels of the reference image.

The motion estimation engine employs a hierarchical approach in some embodiments. Pursuant to the hierarchical approach, the motion estimation engine identifies a subset of candidate blocks within the search area of the reference image based on the pixel activity differences between the subset of candidate blocks and the current block being lower than a threshold value, wherein the pixel activity is measured using a first pixel activity metric. For the subset of candidate blocks, the motion estimation engine then identifies as a match the candidate block having the smallest difference in pixel activity with the current block, wherein the pixel activity is measured using a second pixel activity metric different from the first pixel activity metric. This approach can be repeated to not be limited to first and second pixel activity metrics.

In some embodiments, the motion estimation engine assigns a weight to each pixel activity metric based on activity metric quality, activity metric importance, or other criteria. In some embodiments, the motion estimation engine assigns a weight to each pixel activity metric arbitrarily, or based on an application executing at a processor of the processing system, or based on image content. Based on the weights, the motion estimation engine computes a weighted sum of pixel activity differences between blocks for each pixel activity metric, and selects a candidate block (or possibly multiple candidate blocks) having the lowest weighted sum of pixel activity differences with the current block. If there is one block selected, the motion estimation engine will determine the motion vector. If there are multiple candidate blocks (for example because several blocks had the same pixel activity differences with the current block), then there is a tie. The motion estimation engine uses a traditional motion estimation cost metric to break the tie.

The motion estimation engine defines and trains a machine learning algorithm to select the best match in some embodiments. The machine learning algorithm calculates features based on difference between different pixel activity metrics. In some embodiments, the training of the machine learning algorithm takes place prior to runtime.

A pixel activity metric is not always available for all candidate blocks. In some embodiments, the motion estimation engine estimates a missing pixel activity metric based on interpolation of known pixel activity metrics. For some metrics, the motion estimation engine estimates a missing metric using an integral image or summed area table. For example, for some pixel activity metrics such as the 2D gradient, the motion estimation engine determines the pixels activity of an arbitrary area based on two summed area tables. In some embodiments, the motion estimation engine estimates a missing pixel activity metric based on aggregation of the pixel activity metrics calculated at a finer granularity, with the possibility of some error correction. For example, if a candidate block is offset from and partially overlaps another block having a known pixel activity, in some embodiments, the motion estimation engine uses an error correction based on the offset to estimate the contribution of the candidate block.

The pixel activity metric has a margin of error that the motion estimation engine considers when performing a comparison in some embodiments. For example, if the current block has an activity of 'x', and the candidate block has an activity of y±£, the motion estimation engine will determine that the candidate block is not a match if y−£>X. In some embodiments, the motion estimation engine combines one or more of the above-described methods.

In some embodiments, a processing system includes an encoder configured to encode the current image based on the motion estimation for transmission across a network to a receiving processing system having a decoder and multiple processor cores that independently execute instructions concurrently or in parallel to render the current image in response to commands generated by a central processing unit (CPU) to render the current image based on the motion estimation. Some embodiments of a command generated by the CPU include information defining textures, states, shaders, rendering objects, buffers, and the like that are used by the processing system to render objects or portions thereof in the current image. In some embodiments, the receiving processing system renders the objects to produce values of pixels that are provided to a display, which uses the pixel values to display an image that represents the rendered objects.

Figure 1:
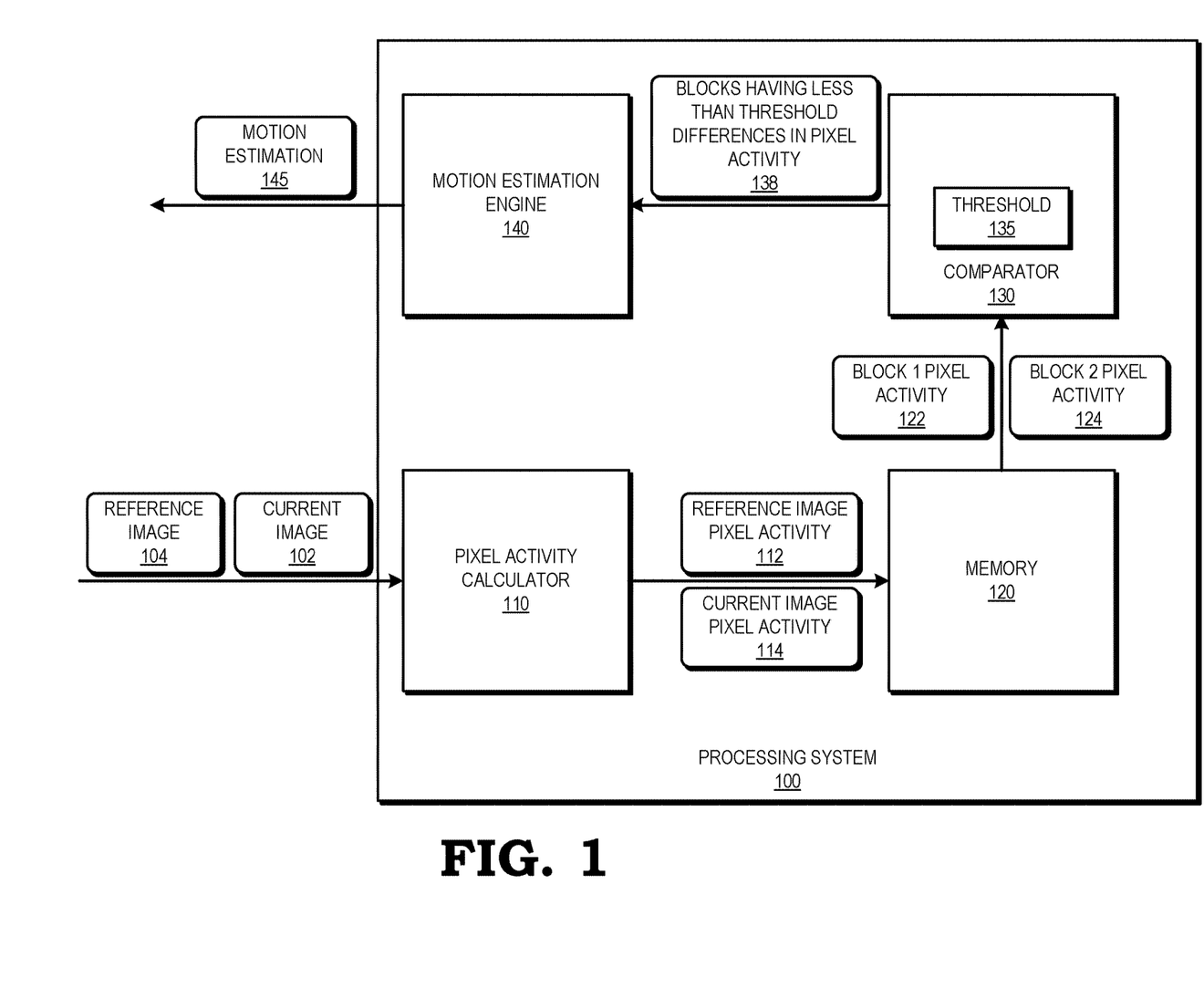
FIG. 1 is a block diagram of a processing system that includes a motion estimation engine to estimate motion based on differences in pixel activity in accordance with some embodiments.

FIG. 1 illustrates a processing system 100 configured to estimate motion between blocks of images based on differences in pixel activity in accordance with some embodiments. The processing system 100 includes a pixel activity calculator 110, a memory 120, a comparator 130, and a motion estimation engine 140. Each of these components may be implemented as hard-coded logic, programmable logic, software executed by a processor, or a combination thereof. In some embodiments, the processing system 100 is distributed across a variety of electronic devices, such as a server, personal computer, tablet, set top box, gaming system, mobile phone, and the like.

The processing system 100 receives digital information that represents a stream or sequence of images in a multimedia stream. The term "multimedia" refers to a stream of data including video data, audio data, and the like, or a combination thereof, and in some embodiments also include control data, metadata, and the like, or any combination thereof. In some embodiments, the digital information is encoded according to an encoding standard such as Moving Picture Expert Group ("MPEG")-2, MPEG-4, Advanced Video Coding ("AVC"), and the like. In some embodiments, the information representative of pictures generated by an application is encoded without reference to any other pictures. For example, in some embodiments, the digital information is encoded as intra-coded images (which are also referred to as I-frames) using only information representative of a current image and without reference to any previously or subsequently encoded images. As used herein, the terms "previous" and "subsequent" refer to relative positions of the images in encoding and decoding order.

In some embodiments, images received by the processing system 100 are also encoded based on one or more previously or subsequently encoded pictures. For example, predicted images (which are also referred to as P-frames) are encoded using information representative of the current image and one or more previous images. A predicted image includes image data, motion vector displacements of features in the image relative to corresponding features in the one or more previous images, or a combination thereof. For another example, bidirectional predicted images (which are also referred to as B-frames) are encoded using information representative of the current image, one or more previous images in decoding order, and one or more subsequent images. A bidirectional predicted image typically includes image data, motion vector displacements of features in the picture relative to corresponding features in the previous or subsequent images, or a combination thereof.

The pixel activity calculator 110 receives different images referred to as current image frame 102 and reference image frame 104. The pixel activity calculator 110 calculates pixel activity of each current block from frame 102 and the reference image frame 104 based on one or more pixel activity metrics. In some embodiments, if the pixel activity calculator 110 previously calculated the pixel activity for the reference image frame 104, the pixel activity calculator 110 reuses the previous calculation of pixel activity for the reference image frame 104. For example, in some embodiments, the pixel activity calculator 110 calculates pixel activity using a gray-level co-occurrence matrix. A gray-level co-occurrence matrix is a matrix defined over an image to the distribution of co-occurring grayscale pixel values at a given offset. In some embodiments, the pixel activity calculator 110 calculates pixel activity for each block of the current image frame 102 and reference image frame 104 using a 2D spatial mean gradient. A 2D spatial mean gradient captures vertical and horizontal edges. In some embodiments, the pixel activity calculator 110 calculates pixel activity of each current block from current image frame 102 and reference image frame 104 using a wavelet transform or other transform to measure an activity parameter for a given block. In some embodiments, the pixel activity calculator 110 calculates pixel activity for each current block from the current image frame 102 and reference image frame 104 based on an average pixel value for each block. Each pixel activity metric has associated costs and benefits that can vary from one application to another.

The memory 120 is configured to store pixel activities calculated by the pixel activity calculator 110. For example, the memory 120 stores pixel activities for a plurality of previously-rendered images such as reference image pixel activity 112 and current image pixel activity 114 that it receives from the pixel activity calculator 110. In some embodiments, the memory 120 is implemented as a dynamic random-access memory (DRAM), and in some embodiments, the memory 120 is also be implemented using other types of memory including static random-access memory (SRAM), non-volatile RAM, and the like.

To facilitate conservation of computational resources, the processing system 100 includes the comparator 130 to compare pixel activity values 112 of blocks of a reference image to the corresponding pixel activity values 114 of blocks of the current image to determine the magnitude of variations in pixel activity values between blocks of the reference image frame 104 and the current image frame 102. The comparator 130 is further configured to compare the pixel activity value variations between blocks of the reference image frame 104 and the current image frame 102 to a threshold 135. If the magnitude of the pixel activity value variations is below the threshold 135, the comparator 130 signals the motion estimation engine 140 that the pixel value variations are below the threshold 135. The comparator 130 and the motion estimation engine 140 are depicted in FIG. 1 as separate entities. However, in some embodiments the comparator 130 is included in the motion estimation engine 140.

The motion estimation engine 140 is configured to receive a subset of candidate blocks 138 of the reference image frame 104 having pixel activity variations less than the threshold 135 (or memory locations for the subset of candidate blocks 138 of the reference image frame 104 having pixel activity variations less than the threshold 135) from the comparator 130. The motion estimation engine 140 compares the subset of candidate blocks 138 of the reference image frame 104 to current block of the current image frame 102 to generate a motion vector field, referred to as motion estimation 145.

In most cases consecutive images will be similar except for changes caused by objects moving within the images or a scene change. To estimate motion, the motion estimation engine 140 determines motion vectors that describe the transformation from one two-dimensional image to another from adjacent images (or the reference image in general) of an image sequence. A motion vector is a two-dimensional vector that provides an offset from the coordinates in one image to the coordinates in another image.

The motion estimation engine 140 compares corresponding pixels of the reference image frame 104 and the current image frame 102 to create a motion estimation 145 that models the movement of objects between the two images. In some embodiments, the motion estimation engine 140 employs a block matching algorithm such as exhaustive search, three step search, simple and efficient search, four step search, diamond search, or other algorithms used in block matching. Any other motion estimation method can be used as well.

In block-based estimation, the pixels of candidate blocks of the reference image frame 104 within a corresponding search window (not shown) are compared with pixels of current blocks of the current image frame 102 to determine a block within the search window which most closely corresponds to the current block. The search window (also referred to as a search area) is a portion of the reference image 104 in which the motion estimation engine 140 searches for the candidate block with the lowest cost. The cost is a measure of similarity between the current block and the candidate block pointed to by a particular motion vector. In some embodiments, the search window is defined as including all blocks within a horizontal distance equal to the horizontal block range from the current block and within a vertical distance equal to the vertical block range from the current block. For example, in some embodiments, the search window encompasses a search range of 8×8 blocks. By basing the cost at least in part on identifying and filtering for blocks having pixel activity variations below the threshold value 135, the processing system 100 reduces the number of block comparisons for motion estimation.

In some embodiments, the motion estimation engine 140 identifies the candidate block within a search area of the reference image frame 104 having the lowest pixel activity variation with the current block of the current image frame 102 as a match for purposes of defining motion vectors between pixels of the reference image frame 104 and pixels of the current image frame 102. In some embodiments, the motion estimation engine 140 identifies a subset of candidate blocks within the search area of the reference image frame 104 based on the pixel activity variations between the subset of candidate blocks and the reference block being lower than the threshold value 135. The motion estimation engine 140 then applies a block-based motion estimation, comparing pixel-by-pixel within the subset, to define motion vectors between pixels of the reference image frame 104 and pixels of the current image frame 102.

In some embodiments, the motion estimation engine 140 identifies a subset of candidate blocks and within the search area of the reference image frame 104 based on the pixel activity variations between the subset of candidate blocks and the current block being lower than the threshold value 135, wherein the pixel activity is measured using a first pixel activity metric. For the subset of candidate blocks 138, the motion estimation engine then identifies as a match the candidate block having the smallest difference in pixel activity with the current block, wherein the pixel activity is measured using a second pixel activity metric different from the first pixel activity metric. For example, in some embodiments, the first pixel activity metric is one of a gray-level co-occurrence matrix, a two-dimensional spatial mean gradient, wavelet or other transform, discrete cosine function, or average value within a block and the second pixel activity metric is a different one of the aforementioned metrics.

In some embodiments, the motion estimation engine 140 assigns a weight to each pixel activity metric based on pixel activity metric quality, activity metric importance, or other criteria. In some embodiments, the motion estimation engine assigns a weight to each pixel activity metric arbitrarily, or based on an application executing at a processor of the processing system, or based on image content. For example, to assess the quality of a pixel activity metric, the motion estimation engine 140 performs a "brute force" motion estimation in which the motion estimation engine 140 compares each candidate block of the reference image frame 104 to the current block of the current image frame 102 to determine a ground truth motion estimation. The motion estimation engine 140 then compares the "brute force" motion estimation to a motion estimation based on the subset 138 of blocks having pixel activity variations less than the threshold 135 measured using each pixel activity metric. The motion estimation engine 140 assigns a quality value for each pixel activity metric based on how closely the pixel activity variations measured using each pixel activity metric match the brute force motion estimation. Based on the pixel activity metric weights, the motion estimation engine 140 computes a weighted sum of pixel activity differences between blocks for each pixel activity metric, and selects as a match for purposes of motion estimation the candidate block having the lowest weighted sum of pixel activity differences with the current block.

In operation, the processing system 100 receives the current image frame 102 and the reference image frame 104 from an application. The pixel activity calculator 110 calculates pixel activity for each block of the current image frame 102 and the reference image frame 104 using one or more pixel activity metrics. The reference image pixel activity 112 and current image pixel activity 114 are stored at the memory 120. The comparator 130 compares the current image pixel activity 114 to candidate blocks within a search area of the reference image pixel activity 112 on a block-by-block basis. For example, the comparator 130 compares pixel activity of a current block 122 of the current image frame 102 to pixel activity of a candidate block 124 of the reference frame 104 within a search window of the current block 122. For example, if the current block 122 of the current image frame ("N") 102 is designated as (N, i, j), the candidate blocks of the reference image frame ("M") 104 within a search window (M, i-x, j-y) for x and y between −1 and 1 (−1, 0, 1) are considered.

The comparator 130 compares the pixel activity variation between blocks to the threshold 135 to identify a subset of candidate blocks 138 of the reference frame 104 having pixel variations with the current block 122 that are less than the threshold 135. The motion estimation engine 140 performs block-based motion estimation based on the subset 138 of candidate blocks having pixel variations with the current block 122 of the current image frame 102 that are less than the threshold 135.

Figure 2:
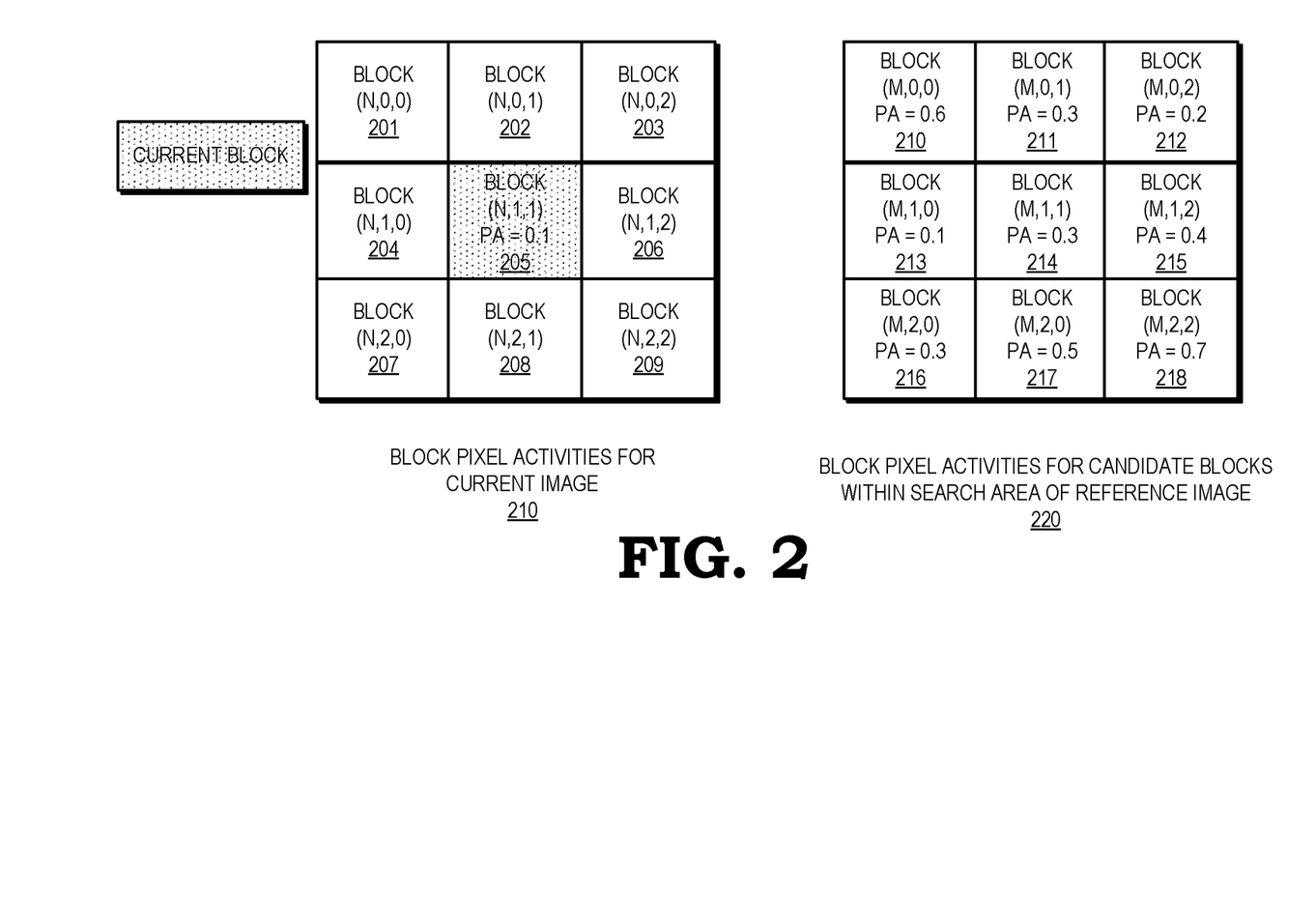
FIG. 2 is a diagram that illustrates pixel activities of blocks of images in accordance with some embodiments.

FIG. 2 illustrates pixel activities of blocks of current image N 210 and reference image M 220 in accordance with some embodiments. Current image N 210 includes blocks 201-209. Block i, j of current image frame N is denoted (N, i, j). Block (N, 1, 1) 205 has a calculated pixel activity of 0.1, with the pixel activity calculated using a first pixel activity metric. Block (i, j) of reference image frame M is denoted (M, i, j). Reference image M 220 includes blocks 210-218 within a search area (M, i±1, j±1). Block (M, 0, 0) 210 has a calculated pixel activity of 0.6, block (M, 0, 1) 211 has a pixel activity of 0.3, block (M, 0, 2) 212 has a pixel activity of 0.2, block (M, 1, 0) 213 has a pixel activity of 0.1, block (M, 1, 1) 214 has a pixel activity of 0.3, block (M, 1, 2) has a pixel activity of 0.4, block (M, 2, 0) has a pixel activity of 0.3, block (M, 2, 0) has a pixel activity of 0.5, and block (M, 2, 2) has a pixel activity of 0.7, with the pixel activities calculated using the same first pixel activity metric.

Given the block pixel activity for the current block (N, 0, 0) 202 of the current image N 210 and for candidate blocks within the search area of reference image M 220, the comparator 130 of FIG. 1 determines the pixel activity variations shown in Table 1 for the current block 202 blocks of the current image N 104 and the candidate blocks within the search area of the reference image M 102.

TABLE 1

| | (N, 1, 1) |
|---|---|
| (M, 0, 0) | 0.5 |
| (M, 0, 1) | 0.2 |
| (M, 0, 2) | 0.1 |
| (M, 1, 0) | 0.0 |
| (M, 1, 1) | 0.2 |
| (M, 1, 2) | 0.3 |
| (M, 2, 0) | 0.2 |

TABLE 1-continued

| | (N, 1, 1) |
|---|---|
| (M, 2, 1) | 0.4 |
| (M, 2, 2) | 0.6 |

Assuming the threshold 135 of FIG. 1 is 0.3, the subset 138 of candidate blocks having pixel variations below the threshold 135 includes (M, 0, 1), (M, 0, 2), (M, 1, 0), (M, 1, 1), and (M, 2, 0). Thus, in the illustrated example, the motion estimation engine 140 only considers 5 out of 9 possible matches for performing a block-based motion estimation, reducing the computational load by nearly half. In one embodiment, the motion estimation engine 140 selects the candidate block with the minimum activity difference—(M, 1, 0)—as the match.

Figure 3:
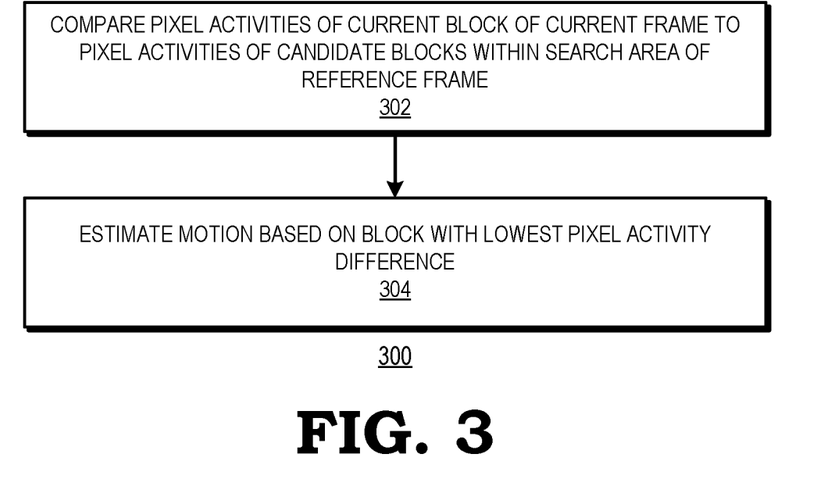
FIG. 3 is a flow diagram illustrating a method for estimating motion based on differences in pixel activity between blocks of images in accordance with some embodiments.

FIG. 3 is a flow diagram illustrating a method 300 for estimating motion based on differences in pixel activity between blocks of reference images 104 and current image 102 of FIG. 1 in accordance with some embodiments. At block 302, the comparator 130 of FIG. 1 compares pixel activities of blocks of reference image frame 104 to pixel activities of the current image frame 102. At block 304, the motion estimation engine 140 estimates motion between the blocks of the reference image frame 104 and the current image frame 102 based on the block of the reference image frame 104 (within the search window) with the lowest pixel activity variation from the current block of the current image frame 102.

Figure 4:
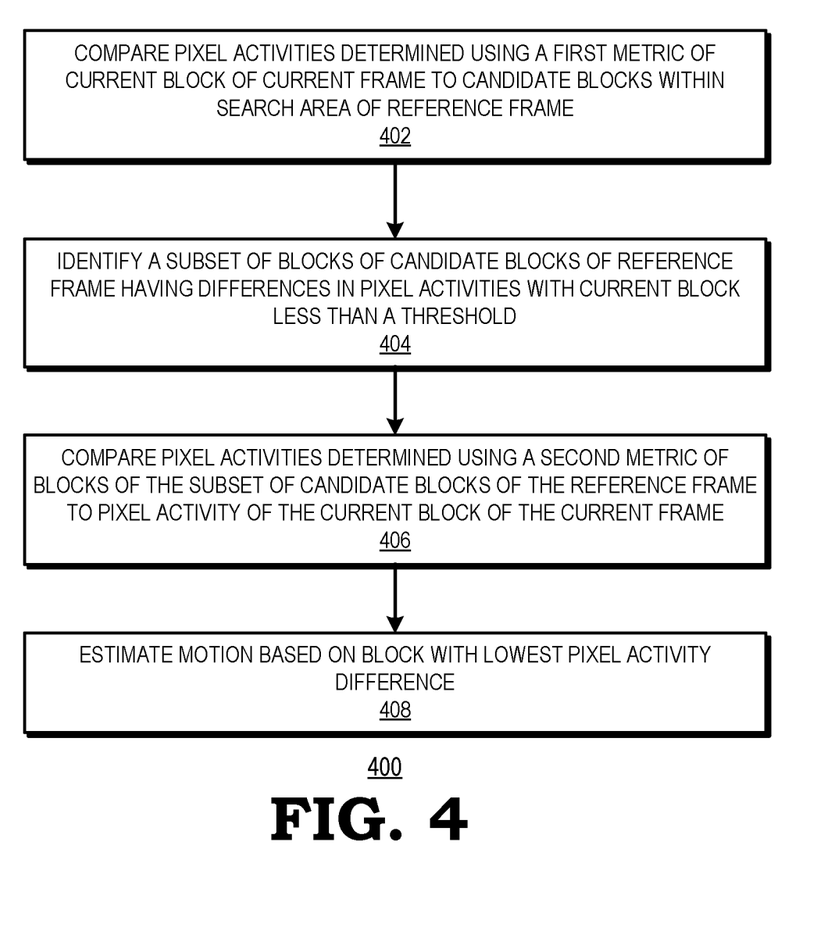
FIG. 4 is a flow diagram illustrating a method for estimating motion based on differences in pixel activity measured using different metrics in accordance with some embodiments.

FIG. 4 is a flow diagram illustrating a method 400 for estimating motion based on differences in pixel activity measured using different metrics in accordance with some embodiments. At block 402, the comparator 130 compares pixel activities determined using a first pixel activity metric for blocks of reference image frame 104 to pixel activities determined using the first pixel activity metric for blocks of current image frame 102 within a search window. At block 404, the comparator 130 identifies a subset 138 of blocks of reference image frame 104 within the search window and current image frame 102 having differences in pixel activities determined using the first pixel activity metric that are less than the threshold 135. At block 406, the comparator 130 compares pixel activities of blocks in the subset 138 determined using a second pixel activity metric different from the first pixel activity metric. At block 408, the motion estimation engine 140 estimates motion between reference image frame 104 and current image frame 102 based on the blocks within the subset 138 having the lowest pixel activity variations based on the second pixel activity metric.

In some embodiments, the apparatus and techniques described above are implemented in a system having one or more integrated circuit (IC) devices (also referred to as integrated circuit packages or microchips), such as the processing system described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
estimating motion between a first image and a second image based on a subset of a plurality of candidate blocks of the second image, wherein the subset of the plurality of candidate blocks has differences in pixel activity with pixel activity of a first block of the first image less than a threshold value, wherein pixel activity comprises variations of pixel intensities within a block; and
encoding the first image based on the estimated motion.

2. The method of claim 1, wherein estimating motion comprises comparing pixels of the first block of the first image to pixels of a second block of the second image in response to determining that a difference in pixel activity between the first block and the second block is less than the threshold value.

3. The method of claim 2, wherein estimating motion comprises:
calculating a cost for each vector of a plurality of vectors from pixels of the first block to pixels of the second block; and
identifying the vector having the lowest cost.

4. The method of claim 1, further comprising identifying the subset of the plurality of candidate blocks of the second image having differences in pixel activity with the first block of the first image within the threshold value, wherein the pixel activity is measured using a first pixel activity metric.

5. The method of claim 4, further comprising:
comparing pixel activity of each block of the subset of the plurality of candidate blocks of the second image with the first block of the first image, wherein the pixel activity is measured using a second pixel activity metric different from the first pixel activity metric.

6. The method of claim 4, wherein comparing pixel activity comprises:
comparing pixel activity of the first block of the first image to pixel activity of a second block of the second image wherein the pixel activity is measured using a first pixel activity metric and a second pixel activity metric; and
assigning a first weight to the first pixel activity metric and a second weight to the second pixel activity metric, wherein estimating motion is based on a weighted sum of differences between pixel activity of the first block of the first image and pixel activity of the second block of the second image, the weighted sum based on the first weight and the second weight.

7. The method of claim 1, further comprising identifying the pixel activity of the first block and the plurality of candidate blocks based on one of: gray-level co-occurrence matrix, a spatial gradient, wavelet transform, discrete cosine function, or average pixel value in a block.

8. A method, comprising:
calculating pixel activity comprising variations of pixel intensities within blocks of a first image;

calculating pixel activity comprising variations of pixel intensities within blocks of a second image;

comparing the pixel activity of a first block of the first image to the pixel activity of the blocks of the second image to determine differences in pixel activity between the first block of the first image and blocks of the second image;

estimating motion between the second image and the first image based on a subset of blocks of the second image having differences in pixel activity with the first block of the first image less than a first threshold; and encoding the first image based on the estimated motion.

9. The method of claim 8, wherein estimating motion comprises:

calculating a cost for each vector of a plurality of vectors from pixels of a first block of the first image to pixels of the subset of blocks of the second image; and identifying the vector having the lowest cost.

10. The method of claim 8, wherein comparing pixel activity comprises identifying a subset of blocks of the second image having differences in pixel activity with the first block of the first image within a threshold value, wherein the pixel activity is measured using a first pixel activity metric.

11. The method of claim 10, further comprising:

comparing pixel activity of each block of the subset of blocks of the second image with the first block of the first image, wherein the pixel activity is measured using a second pixel activity metric different from the first pixel activity metric.

12. The method of claim 10, wherein comparing pixel activity comprises:

comparing pixel activity of the first block of the first image to pixel activity of a second block of the second image wherein the pixel activity is measured using a first pixel activity metric and a second pixel activity metric; and assigning a first weight to the first pixel activity metric and a second weight to the second pixel activity metric, wherein estimating motion is based on a weighted sum of differences between pixel activity of the first block of the first image and pixel activity of the second block of the second image, the weighted sum based on the first weight and the second weight.

13. The method of claim 8, further comprising calculating pixel activity based on one of: gray-level co-occurrence matrix, a spatial gradient, wavelet transform, discrete cosine function, or average pixel value in a block.

14. A device, comprising:

a memory configured to store pixel activities comprising variations of pixel intensities within blocks of a first image and a second image; and a processor configured to:

compare pixel activity of a first block of the first image to pixel activity of a second block of the second image to determine a difference in pixel activity;

estimate motion between the first image and the second image based on a subset of blocks of the second image having differences in pixel activity with the first block of the first image less than a threshold value; and encode the first image based on the estimated motion.

15. The device of claim 14, wherein the processor is configured to estimate motion based on comparing pixels of the first block of the first image to pixels of the second block of the second image in response to determining that the difference in pixel activity is less than the threshold value.

16. The device of claim 15, wherein the processor is configured to estimate motion based on:

calculating a cost for each vector of a plurality of vectors from pixels of the first block to pixels of the second block; and identifying the vector having the lowest cost.

17. The device of claim 14, wherein the processor is configured to identify the subset of blocks of the second image having differences in pixel activity with the first block of the first image within the threshold value, wherein the pixel activity is measured using a first pixel activity metric.

18. The device of claim 17, wherein the processor is configured to compare pixel activity of each block of the subset of blocks of the second image with the first block of the first image, wherein the pixel activity is measured using a second pixel activity metric different from the first pixel activity metric.

19. The device of claim 17, wherein the processor is configured to:

compare pixel activity of the first block of the first image to pixel activity of the second block of the second image wherein the pixel activity is measured using a first pixel activity metric and a second pixel activity metric; and assign a first weight to the first pixel activity metric and a second weight to the second pixel activity metric, wherein the processor is to estimate motion based on a weighted sum of differences between pixel activity of the first block of the first image and pixel activity of the second block of the second image, the weighted sum based on the first weight and the second weight.

20. The device of claim 14, further comprising a pixel activity calculator configured to calculate pixel activity based on one of: gray-level co-occurrence matrix, a spatial gradient, wavelet transform, discrete cosine function, or average pixel value in a block.

* * * * *